Nov. 21, 1961 G. DIRKS 3,010,095

CODE CONVERSION UNIT FOR THE CONTROL OF DEVICES

Filed Dec. 27, 1957 3 Sheets-Sheet 1

INVENTOR
Gerhard Dirks
BY
Michael S. Striker
ATTORNEY

Nov. 21, 1961 G. DIRKS 3,010,095

CODE CONVERSION UNIT FOR THE CONTROL OF DEVICES

Filed Dec. 27, 1957 3 Sheets-Sheet 2

INVENTOR
Gerhard Dirks
BY Michael S. Striker
ATTORNEY

INVENTOR
Gerhard Dirks
BY
Michael S. Striker
ATTORNEY

United States Patent Office 3,010,095

Patented Nov. 21, 1961

3,010,095
CODE CONVERSION UNIT FOR THE CONTROL OF DEVICES

Gerhard Dirks, 44 Morfelder Landstrasse, Frankfurt am Main, Germany

Filed Dec. 27, 1957, Ser. No. 705,681
Claims priority, application Great Britain Dec. 28, 1956
12 Claims. (Cl. 340—172.5)

The present invention relates to a control and code conversion arrangement operated by stored signals, such as, for example, signals stored on record tapes.

In certain applications, for example in the control of line-composing and type-setting machinery, it is desirable to sense stored character-representing signals at a non-uniform rate. If the signals are stored as holes in a punched paper tape a group of such signals, representing one character, is sensed to generate corresponding signals for controlling the line-composing machine and the sensing of the next character group must be delayed until the line-composing machine has completed its operation for the first group. The time of operation of the line-composing machine may be different for different characters or different groups of characters so that, if a fixed time delay is provided between the sensing of successive character groups this delay must be at least as great as the longest time required by the line-composing machine. It will be apparent that under these conditions time is wasted when the particular character which is sensed is one which does not require this maximum time.

Accordingly, it is one object of the present invention to provide an arrangement in which there is a delay between the sensing of the character groups of a succession, the length of which delay is determined in each case by the sensed characters.

It is another object of the invention to provide an arrangement in which a numerical value is derived from each sensed character and this numerical value is used to control the length of the delay intervening before the next character is sensed.

It is a further object of the invention to provide an arrangement in which a group of signals representing a character is simultaneously converted into two different code forms one of the code forms being used to control the delay intervening before the next group of signals is converted.

It is a further object of the invention to provide an improved sensing control arrangement for a line-composing machine.

According to one feature of the invention, a data signal sensing apparatus comprises a storage medium for data signals. The signals are recorded on said medium in groups each of which represents a character. A signal sensing device cooperates with the storage medium. Feeding means is operable by an initiating signal to present a group of signals stored in said medium to the sensing device. Feeding control means is responsive to the sensing of a group of signals so presented to the sensing means to apply an initiating signal to the feeding means after a time delay determined by said sensed signals.

According to another feature of the invention, data signal sensing apparatus comprises a signal record medium having data signals recorded thereon in character-representing groups. A signal sensing device cooperates with the record medium. Feeding means for the record medium is responsive to a succession of initiating signals to feed a corresponding succession of groups of signals past the sensing device. Counter means is responsive to the sensing of a group of signals to set the counter to a value representative of such group. Means is responsive to the sensing of each group of signals to apply a train of timing signals to the counter, to be counted thereby. Means is rendered operative by a predetermined setting of the counter to generate an initiating signal when the counted timing signals reach that setting.

In order that the present invention may be readily carried into effect, it will now be described with reference to the accompanying drawings, in which.

Figure 1:
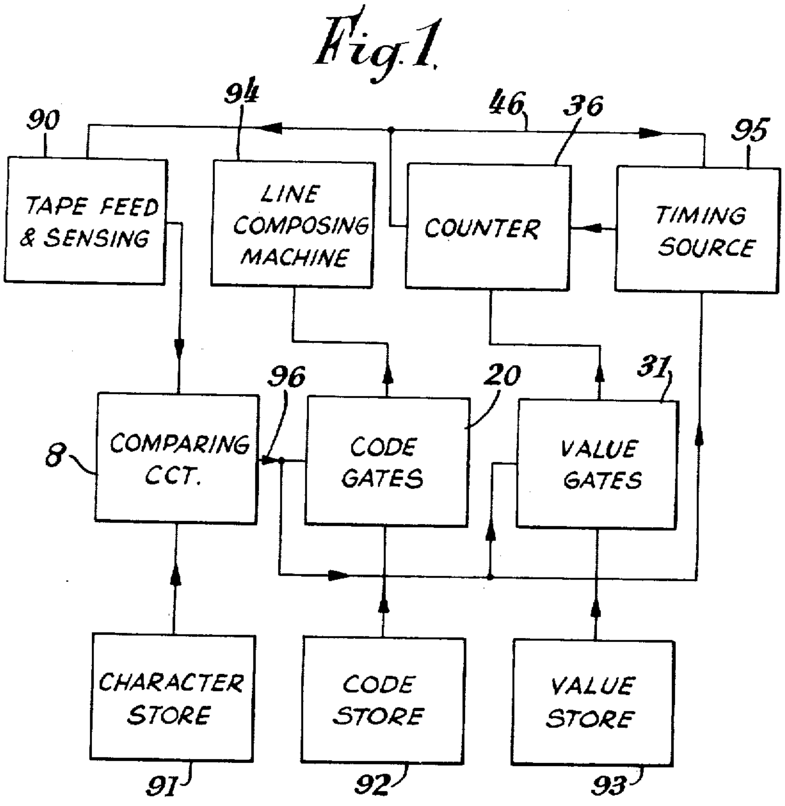
FIG. 1 is a block diagram of an embodiment of the invention used in conjunction with a line-composing machine.

A paper tape punched with groups of holes, each group representing a character, is fed by and sensed by a tape feeding and sensing unit 90, FIG. 1. Each time the unit 90 receives an initiating signal over a line 46 it moves the tape a distance equal to the distance between adjacent character groups on the tape. Signals representing the sensed character group are fed to a comparing circuit 8 which also receives signals from a character store 91. The character store provides in turn signals representing all possible characters which may be recorded in the tape. When the signals received by the comparing circuit 8 from the character store 91 are the same as those received from the tape unit 90, a signal is generated on a line 96. The signal on the line 96 opens a group of code gates 20 to allow signals to be passed from a code store 92 to a line-composing machine 94. The operation of the code store is synchronized with that of the character store so that the line-composing machine receives signals which represent the characters sensed from the tape but arranged in a code which is suitable for operating the line-composing machine.

The signal on the line 96 is also fed to the group of value gates 31 and to a timing source 95. The value gates 31 are opened by this signal to allow signals to pass from a value store 93 to a counter 36. The operation of the value store is synchronized with that of the character and code stores so that the counter is set to start counting from a numerical starting character which is representative of the value sensed from the tape. After a short delay, the timing source 95 is rendered operative to apply a train of pulses to the input of the counter 36. The starting value to which the counter has been set is stepped on one by one for each input pulse from the timing source. When the counter reaches a predetermined value, such as, for example, zero, it generates initiating signals as pulses on the line 46. Such a pulse renders the tape feed operative to bring the next character group to the sensing position and also renders the timing source 95 inoperative. The sensing of this next character group initiates another cycle of operation from that already described.

The starting value entered into the counter on the occurrence of a signal on the line 96 is dependent upon the character sensed by the tape feeding and sensing unit 90. The number of pulses from the timing source 95 required to step the counter 36 on from the set starting value to the predetermined value will also depend therefore on the character which was sensed. Since the pulses from the timing source occur at a fixed frequency, the time delay between the occurrence of a signal on the line 96 and the generation of an initiating signal on the line 46 will be dependent on the sensed character. The counter 36, in conjunction with the value store 93 and the time source 95, operates as a control unit to determine the interval between the sensing of successive character groups by the unit 90. It will be apparent that the counter 36 operates as a variable time delay device, the particular time delay produced being determined by the particular character sensed by the unit 90.

Figure 2:
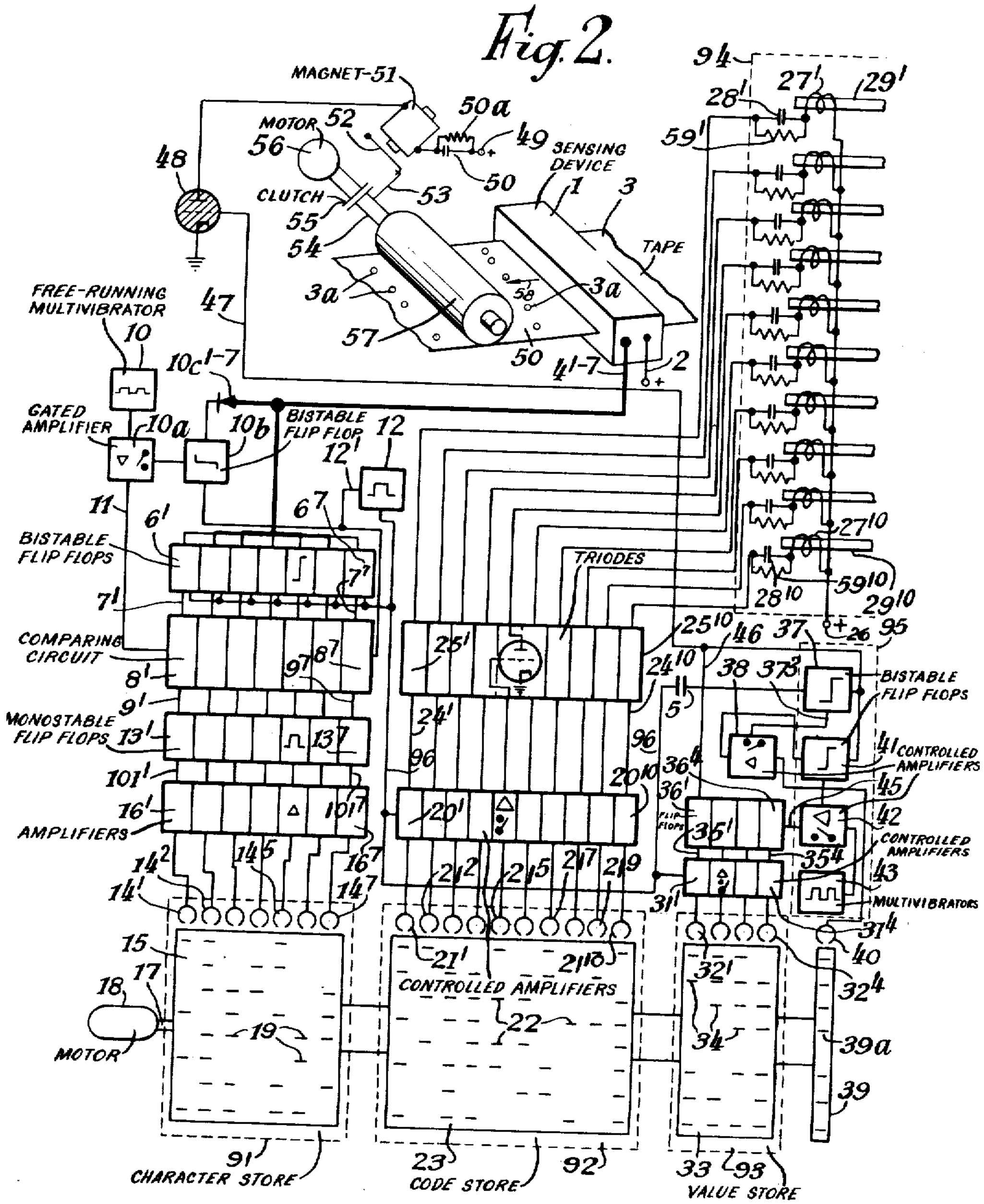
FIG. 2 is a schematic circuit diagram of the arrangement of FIG. 1 in more detail.

The arrangement is shown in more detail in schematic form in FIG. 2. The character-signal groups are recorded as punched holes 3a in a paper tape 3. Each character is represented by a column of holes arranged across the width of the tape in accordance with the usual 7 element code. Each column of the tape is fed in turn through a sensing device 1 by means of a roller 57. The sensing device 1 may comprise seven sensing brushes, each positioned to sense one possible hole position of the tape. Each of these sensing brushes is connected to one of a group of leads $4^1$ to $4^7$. If a brush passes through a hole in the tape it makes contact with a common bus bar which is connected to a positive supply line 2. Thus, a positive potential appears on the corresponding one of the leads 4, which leads are connected to the inputs of a group of bistable flip flop circuits $6^1$ to $6^7$. When one of the flip flops receives a positive potential at its input it is switched on and applies an operating potential over a lead 7 to the corresponding one of the sections $8^1$ to $8^7$ of the comparing circuit 8. Thus, when a particular pattern of holes 3a is sensed, the flip flops 6 are switched on in a similar pattern.

The leads $4^1$ to $4^7$ are also connected through individual diodes $10c^1$ to $10c^7$ (shown as a single diode in FIG. 2) to the input of a bistable flip flop 10b. Thus the flip flop 10b is switched on each time a positive potential appears on any or more of the lines 4, that is, each time a character group is sensed by the sensing device 1. The flip flop 10b is connected to the control lead of a gated amplifier 10a. When the flip flop 10b is on, the amplifier 10a is operative to pass a train of pulses from a free running multi-vibrator 10 to the comparing circuit 8 via a lead 11.

The character store 91, the code store 92 and the value store 93 are mutually similar in construction. They comprise drums 15, 23 and 33, respectively, of non-magnetic material mounted on a common shaft 17 which is driven continuously by an electric motor 18. Around the periphery of the drum 15 are arranged a plurality of inserts of permanently magnetized material. These inserts 19 lie in 7 circumferential rows corresponding to the 7 element code. Each line of inserts parallel to the axis of the drum represents one character code and sufficient lines are provided to represent all possible characters.

Seven magnetic sensing heads $14^1$—$14^7$ are associated with the drum 15. Each head is positioned to sense one of the circumferential rows of inserts 19. Thus, in one rotation of the drum 15, the sensing heads 14 generate signals representing all the possible character codes which may be punched in the tape 3. Each of the heads 14 is connected to the input of a corresponding amplifier of the group $16^1$–$16^7$. Each of these amplifiers is of the conventional capacity coupled type and the output of each amplifier is fed to the input of a respective monostable flip flop of the group $13^1$–$13^7$. The output of each monostable flip flop 13 is applied to one of the sections of the comparing circuit 8. Each flip flop 13 is switched on, on the receipt of a signal from the associated amplifier 16, which signal is generated by the associated head 14 sensing an insert 19. The recovery type of the flip flop 13 is such that they revert to the off condition before another signal can be applied to them from the amplifier 16. The pulse frequency of the pulse train provided by the multi-vibrator 10 is such that at least one pulse is supplied to the comparing circuit 8 during the time when the flip flop 13 may be on.

The comparing circuit 8 is so arranged that if a pulse is applied over the lead 11 at a time when each section of the comparing circuit has equal potentials applied to it by the corresponding flip flops 6 and 13 then a pulse will be produced on an output lead $12^1$.

The pulse on the line $12^1$ is fed to one input of the flip flop 10b to switch it off. This renders the amplifier 10a inoperative and prevents any further pulses from being fed to the comparison circuit 8 from the pulse generator 10.

The pulse on the line $12^1$ is also fed to the input of a monostable flip flop 12 to operate it. A connection is made from one anode of the flip flop 12 to a group of controlled amplifiers $20^1$ to $20^{10}$. Each of these amplifiers is connected to one of a group of magnetic sensing heads $21^1$ to $21^{10}$ which, together with a drum 23, form the storage device 92. The drum 23 is mounted on the shaft 17 and carries a plurality of magnetic inserts 22, in the same way as the drum 15.

The inserts 22 are arranged in axial lines on the drum surface and are so positioned that each line represents the output code for one of the characters. For example, it will be seen from FIGURE 2, that when the heads $14^1$, $14^2$ and $14^5$ simultaneously sense inserts 19, that is, the top line of inserts, the heads $21^1$, $21^2$, $21^5$, $21^7$, $21^9$, and $21^{10}$ will be sensing the inserts 22.

Operation of the flip flop 12 renders the amplifiers 20 responsive to signals from the heads 21. The output of each amplifier 20 is fed to the grid of one of a group of gas triodes $25^1$ to $25^{10}$. The anode of the triode $25^1$ is connected to a positive supply terminal 26 through a capacitor $28^1$ and resistor $59^1$ in parallel, which are in series with winding $27^1$ of a solenoid. The anodes of the other triodes are similarly connected through individual capacitors, resistors and solenoid windings.

If the head $21^1$ senses an insert 22 at the time when the amplifiers 20 are operative, the signal induced in the head produces a positive pulse at the output of the amplifier, which pulse raises the grid potential of the triode $25^1$ sufficiently to cause it to ionize. The triode then effectively connects one plate of the capacitor $28^1$ to ground through a relatively low impedance. The capacitor therefore charges, drawing current through the winding $27^1$. The resistor $59^1$ is of relatively high impedance, so that when the capacitor $28^1$ is nearly fully charged the voltage between the anode and cathode of the triode $25^1$ is insufficient to maintain conduction and the triode deionizes. The capacitor $28^1$ then discharges through the resistor $59^1$ to return the circuit to the original condition.

The charging current flowing through the winding $27^1$ is sufficient to operate an associated armature $29^1$. Corresponding armatures are associated with the other windings 27, so that a group of the armatures are operated corresponding to the pattern of inserts 22 which are sensed by the heads 21 while the amplifiers 20 are operative. The time constant of the flip flop 12 is such that it resets after a time sufficient to allow one line of the inserts 22 to be effectively sensed.

The armatures 29 control the operation of a line-casting or type-setting machine to effect selection of the appropriate type characters in known manner. One arrangement for controlling a line-casting machine is dependence upon the movement of a plurality of electromagnetically controlled armatures is described in detail in Reissue Patent No. 21,543, which was issued on August 27, 1940.

As already explained, the particular character sensed from the tape 3 also controls the delay occurring before the next character is sensed from the tape. This control is effected in the following manner. The operation of the flip flop 12 also renders operative a group of controlled amplifiers $31^1$ to $31^4$. These amplifiers receive inputs from heads $32^1$ to $32^4$. The heads $32^1$ to $32^4$ in conjunction with a drum 33, carrying magnetic inserts 34, form the value store 93. The inserts 34 are arranged in axial lines on thed rum 33, which is rotated by the shaft 17, in a manner comparable with that of the drums 15 and 23.

The heads 32 and gates or controlled amplifiers 31 operate in the same way as the heads 21 and amplifiers 20, so that, when the flip flop 12 is operative, pulses appear on output leads $35^1$ to $35^4$ of the amplifiers $31^1$ to $31^4$ in accordance with the pattern of inserts 34 which are sensed by the heads. Each lead 35 is connected to one grid of a flip flop 36, the four flip flops $36^1$ to $36^4$ being interconnected in the usual manner to form a binary counter. The occurrence of a pulse on a lead 35 switches the associated flip flop 36. Hence, when the flip flop 12 is operated to read out a character in coded form by means of the code store 92, the value store 93 simultaneously sets the binary counter formed by the flip flops $36^1$ to $36^4$ to a value which represents the delay in sensing required for that character. The counter is directly set under control of the particular line of inserts 34 which is effectively sensed, which allows each character to have any one of a number of different delays, the number of delay times being governed only by the counting capacity of the counter.

The output of the flip flop 12 is coupled to the input of a bistable flip flop 37 by a capacitor 5. The operation of the flip flop 12 causes the flip flop 37 to be switched on. One anode of the flip flop 37 is connected by a lead $37^3$ to the control input of a controlled amplifier or gate 38. The gate 38 receives a signal input from a magnetic sensing head 40, which cooperates with a drum 39 carrying magnetic inserts **39*a*. The drum 39 is driven by the shaft 17 and it has an insert 39*a* for each line of inserts 34 on the drum 33**.

The gate 38 is operative, when the flip flop 37 is on, to pass a pulse from the head 40 to the input of another flip flop 41. This pulse switches on the flip flop 41 which thereupon renders operative a gate 42. The input of the the gate 42 is connected to the output of a continuously running pulse generator formed by a astable flip flop, or multivibrator 43. The output of the gate 42 is connected to the flip flop $36^4$ which is the least significant stage of the binary counter formed by the flip flop 36. Consequently, the switching on of the flip flop 41 allows pulses to be fed to the counter to step it on.

The most significant stage $36^1$ of the counter is switched off when the counter reaches the full capacity of sixteen. A lead 46 is capacitively coupled to one anode of the flip flop $36^1$, so that a pulse is produced on this lead when the flip flop switches off. The lead 46 is connected to the other inputs of the flip flops 37 and 41, and the pulse on this lead is effective to switch the flip flops off. This terminates the supply of pulses to the counter stage $36^4$ and leaves the counter registering zero.

The lead 46 is also connected to the grid of a gas triode 48 and the pulse on said lead is effective to ionize said triode. The anode of the triode 48 is connected to a positive supply terminal 49 via the winding of an electromagnet 51 and a capacitor 50 in parallel with a resistor **50*a*. As in the case of the triode 25, the triode 48, when ionized, allows the capacitor 50** to charge and is extinguished when the voltage anode and cathode falls below the maintaining voltage.

The charging current of the capacitor 50 energizes the electromagnet 51, which attracts an associated armature 52. The movement of the armature 52 withdraws it from engagement with a projecting arm 53 which is attached to a shaft 54. The shaft 54 carries a friction roller 57 which is in contact with the tape 3. The diameter of the roller 57 is such that one revolution of the roller moves the tape 3 a sufficient distance in arrow direction 58 to bring the next column of perforations **3*a* into position for sensing by the sensing device 1**.

The shaft 54 is coupled to a continuously running motor 56 through a friction clutch 55. The shaft 54 is normally held stationary by the engagement of the arm 53 with the armature 52. When the arm 53 is released, the shaft 54 and the roller 57 are driven through the friction clutch 55. The triode 48 is deionized shortly after the armature 52 has been operated. This deenergizes the electromagnet 51 and the armature is released to engage the arm 53 after the shaft 54 has completed one revolution. This brings the column of perforations **3*a* into sensing position and the cycle of operations described above is repeated. The armatures 29 will be operated in accordance with the particular combination of perforations. The binary counter 36 will be set to the appropriate value under control of the value store and after a corresponding delay the electromagnet 51** will be energized again to start the next cycle and so on.

The time delay occurring between the ionizing of the triodes 25 and the ionizing of the triode 48 is dependent upon the number of pulses which have to be fed to the binary counter, formed by the stages 36, to reset it to zero, that is, the larger the value entered into the counter the shorter will be the delay. In this way, the desired delay may be provided for each character. The actual time delay is also dependent upon the recurrence frequency of the pulses from the generator 43. Thus, all the different delay times may be increased or decreased proportionately by decreasing or increasing, respectively, the pulse recurrence frequency.

It will be appreciated that the magnetic inserts 19, 22, 34 and **39*a*** may be replaced by signals recorded on a magnetizable surface provided on the drums, in the manner commonly employed for magnetic data storage drums. This has the advantage that the position of the recorded signals may be changed to accommodate a new code, for example. However, the magnetic inserts have the advantage that relatively large signal voltages are generated in the sensing heads. This simplifies the design of the amplifying circuits receiving signals from the sensing heads.

Figure 3:
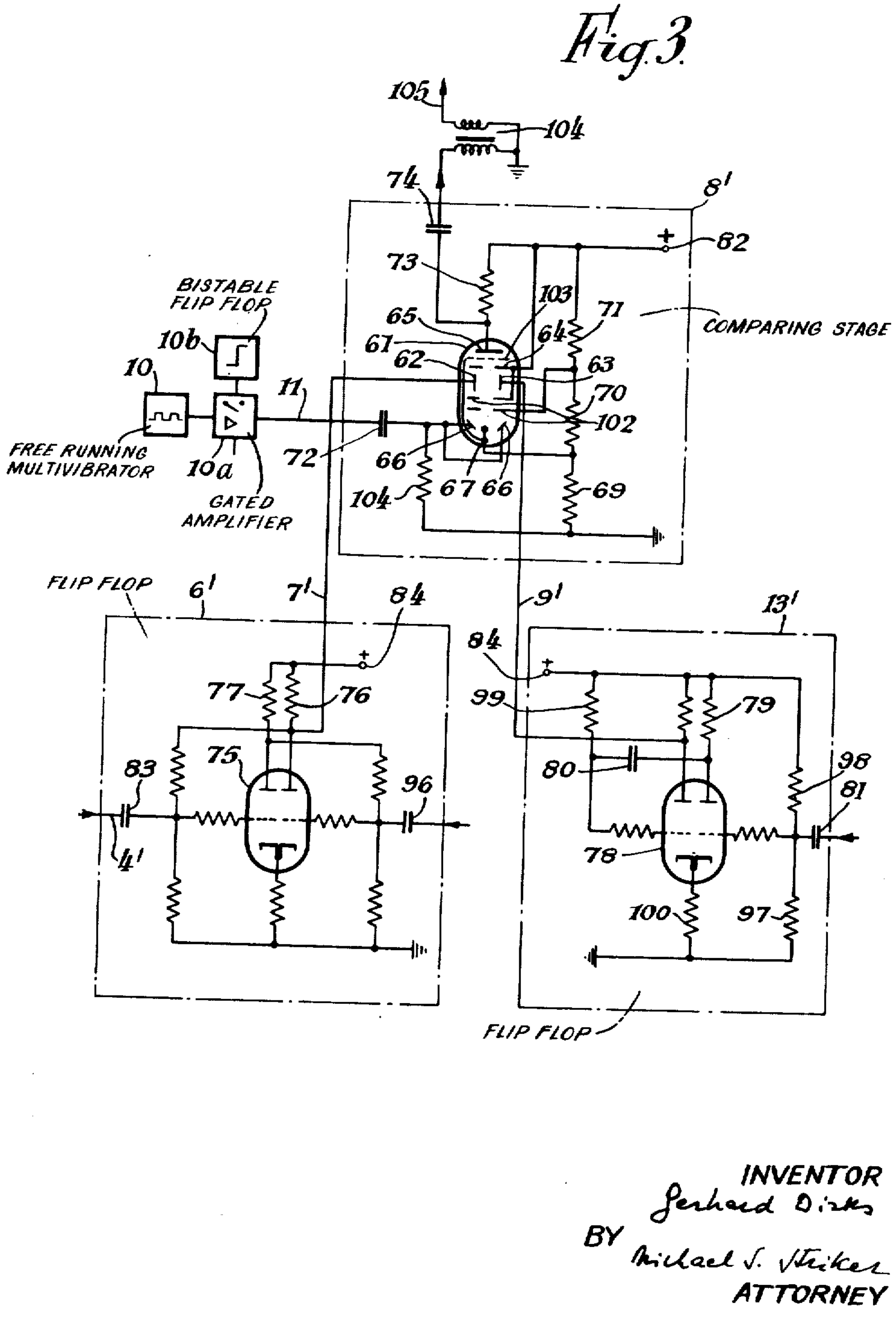
FIG. 3 is a circuit diagram of a coincidence stage of the arrangement of FIG. 2.

The comparing stage $8^1$ and the associated flip flops $6^1$ and $13^1$ are shown in detail in FIG. 3. The bistable flip flop $6^1$ is of conventional design, using a double triode 75 with resistive coupling between each anode and the control grid of the other triode. The anodes of the two triodes are connected through resistors 76 and 77 to a positive supply terminal 84. The lead $4^1$ from the sensing device 1 is coupled to one control grid through a capacitor 83 and a grid stopper resistor. The line 96 is similarly coupled to the other control grid. Thus a change of potential on the line $4^1$ produces a pulse on the grid of the left hand triode and switches the flip flop on. When the monostable flip flop 12 is operated, the potential of the line 96 changes and a pulse appears at the grid of the right hand triode 75 and the flip flop is switched off.

The flip flop $13^1$ is also conventional in design, using a double triode 78 in a cathode coupled circuit. The grid voltage of the right hand triode is fixed by a potentiometer formed by resistors 97 and 98. The grid of the left hand triode is connected through a grid stopper resistor and a resistor 99 to the positive supply terminal 84. The left hand triode draws an anode current determined by the grid current through the series resistors and the voltage drop across common cathode resistor 100. The cathode is thus held positive with respect to the right hand grid and this triode is nonconducting.

If a positive pulse is produced by the amplifier $16^1$ in response to the passage of an insert 19 past the head $14^1$, the pulse is applied to the right hand grid of the double triode 78 via lead $101^1$ and capacitor 81. This causes the right hand triode to conduct and the anode voltage falls due to anode resistor 79. This fall is passed to the left hand grid by coupling capacitor 80 to cut off the left hand triode. This grid then starts to rise toward the voltage of terminal 84 with a time constant determined by resistor 99 and capacitor 80. When the grid voltage approaches the cathode voltage the left hand triode conducts, cutting off the right hand triode and returning the circuit to the unoperated condition.

One anode of each of the flip flops is connected via lines $7^1$ and $9^1$ to deflection electrodes 62 and 63, respectively, of a comparison tube 61. This comparison tube is of the kind manufactured by N. V. Philips and sold commercially under the type number "Valvo E80T." It comprises a cathode 67, control electrodes 66, beam forming electrodes 102, the deflection electrodes 62 and 63, a subsidiary anode 64, a suppressor grid 103 and a final anode 65. If the electrodes 66 are held at a suitable potential, electrons flowing from the cathode 67 are formed into a beam by the electrodes 102. If the deflection electrodes 62 and 63 are at substantially the same potential, the electron beam passes through the gap in the subsidiary anode 64 and impinges on the final anode 65. Current flows through anode resistor 73 and the final anode is below the potential of supply terminal 82.

A potentiometer formed by resistors 69, 70 and 71 between ground and terminal 82 provides a voltage for one set of electrodes 102 and for the cathode 67. The control electrodes are connected through a capacitor 72 to the lead 11 and through a resistor 104 to ground. The cathode 67 is held sufficiently positive with respect to the control electrodes 66 to prevent electron flow to the anode. When a positive pulse occurs on the lead 11, the tube is made conductive and current will flow to the anode 65 provided that the potentials of the electrodes 62 and 63 are the same, that is, that the flip flops $6^1$ and $13^1$ are both on or both off. This produces a negative pulse at the anode 65, which pulse is applied to the primary of a pulse transformer 104, via a capacitor 74. The secondary of the transformer produces a positive pulse which is fed via a lead 105 to the control electrodes of a similar comparison tube which forms the stage $8^2$. Each stage thus provides the input pulse for the next stage. The secondary of the pulse transformer of the last stage $8^7$ is connected to the line $12^1$ to provide the comparison output pulse.

If the two flip flops $6^1$ and $13^1$ are not in the same state, the voltages of the electrodes 62 and 63 will be different and the electron beam will be deflected away from the central position. It then impinges upon the subsidiary anode 64 instead of passing through it and so current flows to the anode 65. Consequently, no pulse is applied to the transformer 104 and no pulse is applied to the stage $8^2$. Similarly, any other stage for which the associated flip flops are in different states will block an applied pulse. Hence an output pulse appears on the line $12^1$ only when the flip flops 6 and 13 of each pair are in the same state.

The bistable flip flops, such as 37 and 41, which are not shown in detail, are similar to the flip flop $6^1$. The monostable flip flop 12 is similar to the flip flop $13^1$. The controllable amplifiers or gates, such as 20 and 31, may conveniently be a conventional pentode gate in which the signal is applied to the control grid and the control voltage is applied to the suppressor grid. The control voltage at one level is sufficient to allow anode current to flow and at the other level prevents anode current flowing. A pulse transformer, similar to the transformer 105, is included in the anode circuit, so that either a positive or negative output may be obtained as required by appropriately connecting the secondary winding.

It will be appreciated that, although a punched paper tape has been described as the source of signals to operate the flip flop 6, the signals may be derived from other forms of signal storage media, such as magnetic tape, which are fed in a discontinuous manner.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim is:

1. Data signal sensing apparatus for a signal record medium with data signals recorded thereon in consecutive character representing groups, each of said groups requiring a respectively characteristic processing time in said apparatus, comprising, in combination, signal sensing means cooperating with said record medium for sensing said date signals; intermittently operable feeding means for said recording medium capable of performing, in response to a succession of initiating signals, a corresponding succession of feeding movements resulting in feeding a corresponding succession of groups of said data signals past said sensing means; time delay means capable of providing an output signal after any one of a plurality of selectable time delays; first control means capable of operating said time delay means in response to the sensing of a group of said data signals by said sensing means; second control means responsive to the sensing of a group of said data signals by said sensing means and operative to select a particular one of said time delays in accordance with the characteristics of the sensed group of said data signals; and means for applying said output signals of said time delay means as said initiating signals to said feeding means, whereby the time delay between said initiating signals of said succession thereof is determined by the sensed data signals.

2. Data signal sensing apparatus for a signal record medium with data signals recorded thereon in consecutive character representing groups, each of said groups requiring a respectively characteristic processing time in said apparatus, comprising, in combination, signal sensing means for said record medium for sensing said data signals; intermittently operable feeding means for said record medium capable of presenting, in response to an initiating signal, a group of said data signals to said sensing means for being set thereby, in response to the sensing of a group of data signals, to a starting value representative of that particular group; timing means capable of applying, in response to the sensing of said particular group of data signals, a train of timing signals characteristic of said particular group to said counter means to be counted thereby; and means for generating said initiating signal for said feeding means and capable of being rendered operative by said counter, when the count of said timing signals reaches a predetermined value, whereby the next following group of data signals is caused to be presented to said sensing means in response to each initiating signal.

3. Data signal sensing apparatus for a signal record medium with data signals recorded thereon in consecutive character representing groups, each of said groups requiring a respectively characteristic processing time in said apparatus, comprising, in combination, signal sensing means for said record medium for sensing said data signals; intermittently operable feeding means for said record medium capable of presenting, in response to an initiating signal, a group of said data signals to said sensing means; counter means operatively connected with said sensing means for being set thereby, in response to the sensing of a group of data signals, to a starting value representative of that particular group, said counter means including setting means comprising value storage means having representations stored therein of a plurality of said starting values respectively corresponding to a plurality of different characters, and means capable of entering into said counter, in response to the sensing of a particular character by said sensing means, the corresponding starting value in the form of a corresponding setting signal; timing means capable of applying, in response to the sensing of said particular group of data signals, a train of timing signals characteristic of said particular group to said counter means to be counted thereby; and means for generating said initiating signal for said feeding means and capable of being rendered operative by said counter, when the count of said timing signals reaches a predetermined value, whereby the next following group of data signals is caused to be presented to said sensing means in response to each initiating signal.

4. Data signal sensing apparatus for a signal record medium with data signals recorded thereon in consecutive character representing groups, each of said groups requiring a respectively characteristic processing time in said apparatus, comprising, in combination, signal sensing means for said record medium for sensing said data signals; intermittently operable feeding means for said record medium capable of presenting, in response to an initiating signal, a group of said data signals to said sensing means; counter means operatively connected with said sensing means for being set thereby, in response to the sensing of a group of data signals, to a starting value representative of that particular group, said counter means including setting means comprising a plurality of binary counting stages, and value storage means having representations stored therein of a plurality of said starting values respectively corresponding to a plurality of different characters and having means for generating setting signals and for applying said setting signals individually to said counting stages and for thus entering into said counter, in response to the sensing of a particular character by said sensing means, the corresponding starting value in the form of a corresponding setting signal; timing means capable of applying, in response to the sensing of said particular group of data signals, a train of timing signals characteristic of said particular group to said counter means to be counted thereby; and means for generating said initiating signal for said feeding means and capable of being rendered operative by said counter, when the count of said timing signals reaches a predetermined value, whereby the next following group of data signals is caused to be presented to said sensing means in response to each initiating signal.

5. Data signal sensing apparatus for a signal record medium with data signals recorded thereon in consecutive character representing groups, each of said groups requiring a respectively characteristic processing time in said apparatus, comprising, in combination, signal sensing means for said record medium for sensing said data signals; intermittently operable feeding means for said record medium capable of presenting, in response to an initiating signal, a group of said data signals to said sensing means; counter means operatively connected with said sensing means for being set thereby, in response to the sensing of a group of data signals, to a starting value representative of that particular group, said counter means including setting means comprising a plurality of binary counting stages, and value storage means having representations stored therein of a plurality of said starting values respectively corresponding to a plurality of different characters and having means for generating setting signals and for applying said setting signals individually to said counting stages and for thus entering into said counter, in response to the sensing of a particular character by said sensing means, the corresponding starting value in the form of a corresponding setting signal; timing means capable of applying, in response to the sensing of said particular group of data signals, a train of timing signals characteristic of said particular group to said counter means to be counted thereby; gating means interposed between said timing means and said counter means for transmitting said timing signals to said counter means; means for generating said initiating signal for said feeding means and capable of being rendered operative by said counter, when the count of said timing signals reaches a predetermined value, whereby the next following group of data signals is caused to be presented to said sensing means in response to each initiating signal; and means for applying said initiating signals to said gating means for rendering the latter ineffective to transmit said timing signals.

6. Sensing apparatus for sensing a signal record medium having recorded thereon a succession of character representing data signal groups, each of said groups requiring a respectively characteristic processing time in said apparatus, comprising, in combination, signal sensing means for sensing said signal groups in succession; intermittently operable feeding means for feeding said record medium to present data signal groups sequentially to said sensing means, said feeding means being capable, in response to an initiating signal, of presenting a particular data signal group to said sensing means; character storage means for storing signals respectively constituting representations of all possible signal groups which may be recorded on said record medium; comparing means interposed between said signal sensing means and said storage device and responsive to signals from said signal sensing means and to signals from said character storage device for comparing a sensed group of signals sequentially with said stored representation signals and for generating a comparison signal upon occurrence of equality between said compared signals; time delay means capable of providing an output signal after any one of a plurality of selectable time delays; control means responsive to said comparison signal and capable of rendering, in dependence on the sensing of a data signal group by said sensing means, said time delay means operative and of selecting a particular one of said time delays; and means for applying an output signal from said delay means as an initiating signal to said feeding means for causing the latter to present the next data signal group out of said succession thereof to said sensing means.

7. Sensing apparatus for sensing a signal record medium having recorded thereon a succession of character representing data signal groups, each of said groups requiring a respectively characteristic processing time in said apparatus, comprising, in combination, signal sensing means for sensing said signal groups in succession, intermittently operable feeding means for feeding said record medium to present data signal groups sequentially to said sensing means, said feeding means being capable, in response to an initiating signal, of presenting a particular data signal group to said sensing means; character storage means for storing signals respectively constituting representations of all possible signal groups which may be recorded on said record medium; code storage means being operable in synchronism with said character storage means and having stored therein representations of all said possible data signal groups expressed in a special code; comparing means interposed between said signal sensing means and said storage device and responsive to signals from said signal sensing means and to signals from said character storage device for comparing a sensed group of signals sequentially with said stored representation signals and for generating a comparison signal upon occurrence of equality between said compared signals; gating means interposed between said code storage means and said comparing means and capable of being controlled by said representation signals as applied through said comparison means in such a manner that said gating means are rendered effective by said comparison signal so as to provide output signals representing the sensed data signal group in said special code; time delay means capable of providing an output signal after any one of a plurality of selectable time delays; control means responsive to said comparison signal and capable of rendering, in dependence on the sensing of a data signal group by said sensing means, said time delay means operative and of selecting a particular one of said time delays; and means for applying an output signal from said delay means as an initiating signal to said feeding means for causing the latter to present the next data signal group out of said succession thereof to said sensing means.

8. Sensing apparatus for sensing a signal record medium having recorded thereon a succession of character representing data signal groups, each of said groups requiring a respectively characteristic processing time in said apparatus, comprising, in combination, signal sensing means for sensing said signal groups in succession; intermittently operable feeding means for feeding said record medium to present data signal groups sequentially to said sensing means, said feeding means being capable, in response to an initiating signal, of presenting a particular data signal group to said sensing means; character storage means for storing signals respectively constituting representations of all possible signal groups which may be recorded on said record medium; code storage means being operable in synchronism with said character storage means and having stored therein representations of all said possible data signal groups expressed in a special code; comparing means interposed between said signal sensing means and said storage device and responsive to signals from said signal sensing means and to signals from said character storage device for comparing a sensed group of signals sequentially with said stored representation signals and for generating a comparison signal upon occurrence of equality between said compared signals; gating means interposed between said code storage means and said comparing means and capable of being controlled by said representation signals as applied through said comparison means in such a manner that said gating means are rendered effective by said comparison signal so as to provide output signals representing the sensed data signal group in said special code; time delay means capable of providing an output signal after any one of a plurality of selectable time delays; control means responsive to said comparison signal and capable of rendering, in dependence on the sensing of a data signal group by said sensing means, said time delay means operative and of selecting a particular one of said time delays; and means for applying an output signal from said delay means as an initiating signal to said feeding means for causing the latter to present the next data signal group out of said succession thereof to said sensing means; and a plurality of electromagnetic control means adapted to control associated devices serviced by said sensing apparatus, and connected to said gating means for being selectively actuated by said output signals of said gating means in accordance with the sensed signal data group as expressed in said special code.

9. Sensing apparatus for sensing a signal record medium having recorded thereon a succession of character representing data signal groups, each of said groups requiring a respectively characteristic processing time in said apparatus, comprising, in combination, signal sensing means for sensing said signal groups in succession; intermittently operable feeding means for feeding said record medium to present data signal groups sequentially to said sensing means, said feeding means being capable, in response to an initiating signal, of presenting a particular data signal group to said sensing means; character storage means for storing signals respectively constituting representations of all possible signal groups which may be recorded on said record medium; code storage means being operable in synchronism with said character storage means and having stored therein representations of all said possible data signal groups expressed in a special code; comparing means interposed between said signal sensing means and said storage device and responsive to signals from said signal sensing means and to signals from said character storage device for comparing a sensed group of signals sequentially with said stored representation signals and for generating a comparison signal upon occurrence of equality between said compared signals; gating means interposed between said code storage means and said comparing means and capable of being controlled by said representation signals as applied through said comparison means in such a manner that said gating means are rendered effective by said comparison signal so as to provide output signals representing the sensed data signal group in said special code; time delay means capable of providing an output signal after any one of a plurality of selectable time delays; control means responsive to said comparison signal and capable of rendering, in dependence on the sensing of a data signal group by said sensing means, said time delay means operative; time delay value storage means operable in synchronism with said character storage means and having stored representations of a plurality of different time delay values corresponding respectively to different time delay values associated with corresponding data signal groups, said stored time delay value representations being selectable under control of said comparing signals for being applied to said counter means and for determining the duration of said time delays; means for applying an output signal from said delay means as an initiating signal to said feeding means for causing the latter to present the next data signal group out of said succession thereof to said sensing means; and a plurality of electro-magnetic control means adapted to control associated devices serviced by said sensing apparatus, and connected to said gating means for being selectively actuated by said output signals of said gating means in accordance with the sensed signal data group as expressed in said special code.

10. Sensing apparatus for sensing a signal record medium having recorded thereon a succession of character representing data signal groups, each of said groups requiring a respectively characteristic processing time in said apparatus, comprising, in combination, signal sensing means for sensing said signal groups in succession; intermittently operable feeding means for feeding said record medium to present data signal groups sequentially to said sensing means, said feeding means being capable, in response to an initiating signal, of presenting a particular data signal group to said sensing means; character storage means for storing signals respectively constituting representations of all possible signal groups which may be recorded on said record medium; code storage mean being operable in synchronism with said character storage means and having stored therein representations of all said possible data signal groups expressed in a special code; comparing means interposed between said signal sensing means and said storage device and responsive to signals from said signal sensing means and to signals from said character storage device for comparing a sensed group of signals sequentially with said stored representation signals and for generating a comparison signal upon occurrence of equality between said compared signals; gating means interposed between said code storage means and said comparing means and capable of being controlled by said representation signals as applied through said comparison means in such a manner that said gating means are rendered effective by said comparison signal so as to provide output signals representing the sensed data signal group in said special code; time delay means capable of providing an output signal after any one of a plurality of selectable time delays; control means responsive to said comparison signal and capable of rendering, in dependence on the sensing of a data signal group by said sensing means, said time delay means operative; time delay value storage means operable in synchronism with said character storage means and having stored representations of a plurality of different time delay values corresponding respectively to different time delay values associated with corresponding data signal groups, said stored time delay value representations being selectable under control of said comparing signals for being applied to said counter means and for determining the duration of said time delays; means for applying an output signal from said delay means as an initiating signal to said feeding means for causing the latter to present the next data signal group out of said succession thereof to said sensing means; and a plurality of electromagnetic control means adapted to control associated devices serviced by said sensing apparatus, and connected to said gating means for being selectively actuated by said output signals of said gating means in accordance with the sensed signal data group as expressed in said special code, each of said storage means comprising storage sensing means and a member rotated at constant speed cooperating with said storage sensing means and operable for presenting said stored representations in sequence to said storage sensing means.

11. Sensing apparatus for sensing a signal record medium having recorded thereon a succession of character representing data signal groups, each of said groups requiring a respectively characteristic processing time in said apparatus, comprising, in combination, signal sensing means for sensing said signal groups in succession; intermittently operable feeding means for feeding said record medium to present data signal groups sequentially to said sensing means, said feeding means being capable, in response to an initiating signal, of presenting a particular data signal group to said sensing means character storage means for storing signals respectively constituting representations of all possible signal groups which may be recorded on said record medium; code storage means being operable in synchronism with said character storage means and having stored therein representations of all said possible data signal groups expressed in a special code; comparing means interposed between said signal sensing means and said storage device and responsive to signals from said signal sensing means and to signals from said character storage device for comparing a sensed group of signals sequentially with said stored representation signals and for generating a comparison signal upon occurrence of equality between said compared signals; gating means interposed between said code storage means and said comparing means and capable of being controlled by said representation signals as applied through said comparison means in such a manner that said gating means are rendered effective by said comparison signal so as to provide output signals representing the sensed data signal group in said special code; time delay means capable of providing an output signal after any one of a plurality of selectable time delays; control means responsive to said comparison signal and capable of rendering, in dependence on the sensing of a data signal group by said sensing means, said time delay means operative; time delay value storage means operable in synchronism with said character storage means and having stored representations of a plurality of different time delay values corresponding respectively to different time delay values associated with corresponding data signal groups, said stored time delay value representations being selectable under control of said comparing signals for being applied to said counter means and for determining the duration of said time delays; means for applying an output signal from said delay means as an initiating signal to said feeding means for causing the latter to present the next data signal group out of said succession thereof to said sensing means; and a plurality of electro-magnetic control means adapted to control associated devices serviced by said sensing apparatus, and connected to said gating means for being selectively actuated by said output signals of said gating means in accordance with the sensed signal data group as expressed in said special code, each of said storage means comprising storage sensing means comprising a plurality of magnetic sensing heads, and a member rotated at constant speed cooperating with said storage sensing means and operable for presenting said stored representations in sequence to said storage sensing means, said member being a drum of non-magnetic material having magnetized inserts arranged in a pre-determined pattern on the circumference thereof to form the stored representations.

12. Sensing apparatus for sensing a signal record tape having recorded thereon a succession of character representing punched data signal groups, each of said groups requiring a respectively characteristic processing time in said apparatus, comprising, in combination, signal sensing means for sensing said signal groups in succession; intermittently operable feeding means for feeding said record tape to present data signal groups sequentially to said sensing means, said feeding means being capable, in response to an initiating signal, of presenting a particular data signal group to said sensing means, said feeding means comprising a roller frictionally engaging said tape, a constantly rotating drive shaft, and clutch means operable by an initiating signal for connecting said roller to said drive shaft to cause the roller to make one revolution; character storage means for storing signals respectively constituting representations of all possible signal groups which may be recorded on said record medium; code storage means being operable in synchronism with said character storage means and having stored therein representations of all said possible data signal groups expressed in a special code; comparing means interposed between said signal sensing means and said storage device and responsive to signals from said signal sensing means and to signals from said character storage device for comparing a sensed group of signals sequentially with said stored representation signals and for generating a comparison signal upon occurrence of equality between said compared signals; gating means interposed between said code storage means and said comparing means and capable of being controlled by said representation signals as applied through said comparison means in such a manner that said gating means are rendered effective by said comparison signal so as to provide output signals representing the sensed data signal group in said special code; time delay means capable of providing an output signal after any one of a plurality of selective time delays; control means responsive to said comparison signal and capable of rendering, in dependence on the sensing of a data signal group by said sensing means, said time delay means operative; time delay value storage means operable in synchronism with said character storage means and having stored representations of a plurality of different time delay values associated with corresponding data signal groups, said stored time delay value representations being selectable under control of said comparing signals for being applied to said counter means and for determining the duration of said time delays; means for applying an output signal from said delay means as an initiating signal to said feeding means for causing the latter to present the next data signal group out of said succession thereof to said sensing means; and a plurality of electromagnetic control means adapted to control associated devices serviced by said sensing apparatus, and connected to said gating means for being selectively actuated by said output signals of said gating means in accordance with the sensed signal data group as expressed in said special code, each of said storage means comprising storage sensing means comprising a plurality of magnetic sensing heads, and a member rotated at constant speed cooperating with said storage sensing means and operable for presenting said stored representations in sequence to said storage sensing means, said member being a drum of non-magnetic material having magnetized inserts arranged in a pre-determined pattern on the circumference thereof to form the stored representations.

References Cited in the file of this patent

UNITED STATES PATENTS

| | | |
|---|---|---|
| 2,714,843 | Hooven | Aug. 9, 1955 |
| 2,853,696 | Mendelson | Sept. 23, 1958 |
| 2,866,506 | Hierath et al. | Dec. 30, 1958 |